(12) United States Patent
Sugumar et al.

(10) Patent No.: US 8,782,161 B2
(45) Date of Patent: Jul. 15, 2014

(54) METHOD AND SYSTEM FOR OFFLOADING COMPUTATION FLEXIBLY TO A COMMUNICATION ADAPTER

(75) Inventors: Rabin A. Sugumar, Sunnyvale, CA (US); David Brower, Alamo, CA (US)

(73) Assignee: Oracle International Corporation, Redwood City, CA (US)

( * ) Notice: Subject to any disclaimer, the term of this patent is extended or adjusted under 35 U.S.C. 154(b) by 371 days.

(21) Appl. No.: 13/173,473

(22) Filed: Jun. 30, 2011

(65) Prior Publication Data
US 2013/0007181 A1    Jan. 3, 2013

(51) Int. Cl.
G06F 15/167    (2006.01)

(52) U.S. Cl.
USPC ............................................ 709/212; 709/213

(58) Field of Classification Search
USPC ........................................................ 709/212
See application file for complete search history.

(56) References Cited

U.S. PATENT DOCUMENTS

| | | | | |
|---|---|---|---|---|
| 2001/0049755 A1* | 12/2001 | Kagan et al. | ............... | 710/22 |
| 2005/0050283 A1* | 3/2005 | Miller et al. | ............... | 711/150 |
| 2011/0148460 A1* | 6/2011 | Vorbach | ............... | 326/38 |

OTHER PUBLICATIONS

Pfister, Gregory; "An Introduction to the Infiniband Architecture"; IBM Enterprise Server Group, Chapter 42, pp. 617-632, (2002).
Shanley, Tom; "Infiniband Network Architecture", MindShare, Inc., Chapter 1, pp. 9-24 (2003).
Shanley, Tom; "Infiniband Network Architecture", MindShare, Inc., Chapters 3-6, pp. 31-129 (2003).
Shanley, Tom; "Infiniband Network Architecture", MindShare, Inc., Chapter 13, pp. 259-289 (2003).

* cited by examiner

*Primary Examiner* — Viet Vu
*Assistant Examiner* — Herman Belcher
(74) *Attorney, Agent, or Firm* — Osha Liang LLP (57) ABSTRACT

A method for offloading computation flexibly to a communication adapter includes receiving a message that includes a procedure image identifier associated with a procedure image of a host application, determining a procedure image and a communication adapter processor using the procedure image identifier, and forwarding the first message to the communication adapter processor configured to execute the procedure image. The method further includes executing, on the communication adapter processor independent of a host processor, the procedure image in communication adapter memory by acquiring a host memory latch for a memory block in host memory, reading the memory block in the host memory after acquiring the host memory latch, manipulating, by executing the procedure image, the memory block in the communication adapter memory to obtain a modified memory block, committing the modified memory block to the host memory, and releasing the host memory latch.

20 Claims, 6 Drawing Sheets

METHOD AND SYSTEM FOR OFFLOADING COMPUTATION FLEXIBLY TO A COMMUNICATION ADAPTER

BACKGROUND

Cluster computing typically provide applications that are distributed among a number of servers to provide a service. The servers in a cluster are connected through a network fabric such as Ethernet or Infiniband®, where the cluster applications require communication between the servers. For instance, one server might require a block of data that is owned by another server. In this case, the requesting server sends a message to the owning server requesting the block, and a process on the owning server examines the message and provides the block or sends another response depending on the current state of the block and a variety of factors.

Often in the course of running cluster applications, inter-server communication is frequent and a significant fraction of available server CPU time may be devoted to servicing network requests. Typically, the work performed at the responding server is minor, but the CPU cost of initiating a process to service the request and accessing the packet through different software layers is significant.

SUMMARY

In general, in one aspect, the invention relates to a method for offloading computation flexibly to a communication adapter. The method includes receiving a message that includes a procedure image identifier associated with a procedure image of a host application, determining a procedure image and a communication adapter processor using the procedure image identifier, and forwarding the first message to the communication adapter processor configured to execute the procedure image. The method further includes executing, on the communication adapter processor independent of a host processor, the procedure image in communication adapter memory by acquiring a host memory latch for a memory block in host memory, reading the memory block in the host memory after acquiring the host memory latch, manipulating, by executing the procedure image, the memory block in the communication adapter memory to obtain a modified memory block, committing the modified memory block to the host memory, and releasing the host memory latch.

In general, in one aspect the invention relates to a communication adapter. The communication includes communication adapter memory configured to store a procedure image of a host application, and a harness. The harness is configured to receive a message that includes a procedure image identifier associated with a procedure image of a host application, determine a procedure image and a communication adapter processor using the procedure image identifier, and forward the message to the communication adapter processor configured to execute the procedure image. The communication adapter further includes communication adapter processors that include the communication adapter processor configured to execute the procedure image by acquiring a host memory latch for a memory block in host memory, reading the memory block in the host memory, manipulating, by executing the procedure image, the memory block in the communication adapter memory to obtain a modified memory block, committing the modified memory block to the host memory, and unlocking the host memory latch.

In general, in one aspect the invention relates to a non-transitory computer readable medium storing instructions for offloading computation flexibly to a communication adapter. The instructions include functionality to receive a message that includes a procedure image identifier associated with a procedure image of a host application, determine a procedure image and a communication adapter processor using the procedure image identifier, forward the first message to the communication adapter processor configured to execute the procedure image, and execute, on the communication adapter processor independent of a host processor, the procedure image in communication adapter memory. Executing the procedure image includes acquiring a host memory latch for a memory block in host memory, reading the memory block in the host memory after acquiring the host memory latch, manipulating, by executing the procedure image, the memory block in the communication adapter memory to obtain a modified memory block, committing the modified memory block to the host memory, and unlocking the host memory latch.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for offloading computation flexibly to a communication adapter. Specifically, embodiments of the invention offload computation to the communication adapter by executing procedure images in communication adapter memory. In one or more embodiments of the invention, the procedure image may be particular to an application executing on the host. Further, in one or more embodiments of the invention, different host applications may request that different procedure images are used. Moreover, a host application may request that a procedure image is executed for processing a communication from one remote node and that a second procedure image is executed for processing a communication from another remote node. In one or more embodiments of the invention, the procedure image may be received from a host application and preloaded into the communication adapter memory for execution by communication adapter processor. Furthermore, in one or more embodiments of the invention, the offloading of the procedure image to the communication adapter may be performed at runtime. Specifically, while the host system is executing and sending and receiving messages via the network, the host system may configure and send procedure image(s) to the communication adapter to process messages received on the network.

A procedure image is an executable image that includes a set of instructions for execution by the communication adapter rather than the host. The procedure image is configured to perform processing of a packet. For example, if the packet is a request for status of data from memory, the procedure image may include functionality to access obtain the status information for the data from memory. The procedure image may include a set of procedures and an entry function. Each procedure in the set of procedures defines the instructions to perform on one or more packets. In one or more embodiments of the invention, the procedure image performs the functionality of an application. In other words, the procedure image corresponds to a piece of the application. Thus, by executing the procedure image, the communication adapter performs application layer processing in one or more embodiments of the invention. The entry function includes functionality to examine a packet and determine which procedure to call to process the packet. In one or more embodiments of the invention, the procedure image is a small program. For example, the procedure image may be only 128 kilobytes. However, the procedure image may be larger or smaller without departing from the invention.

Figure 1A:
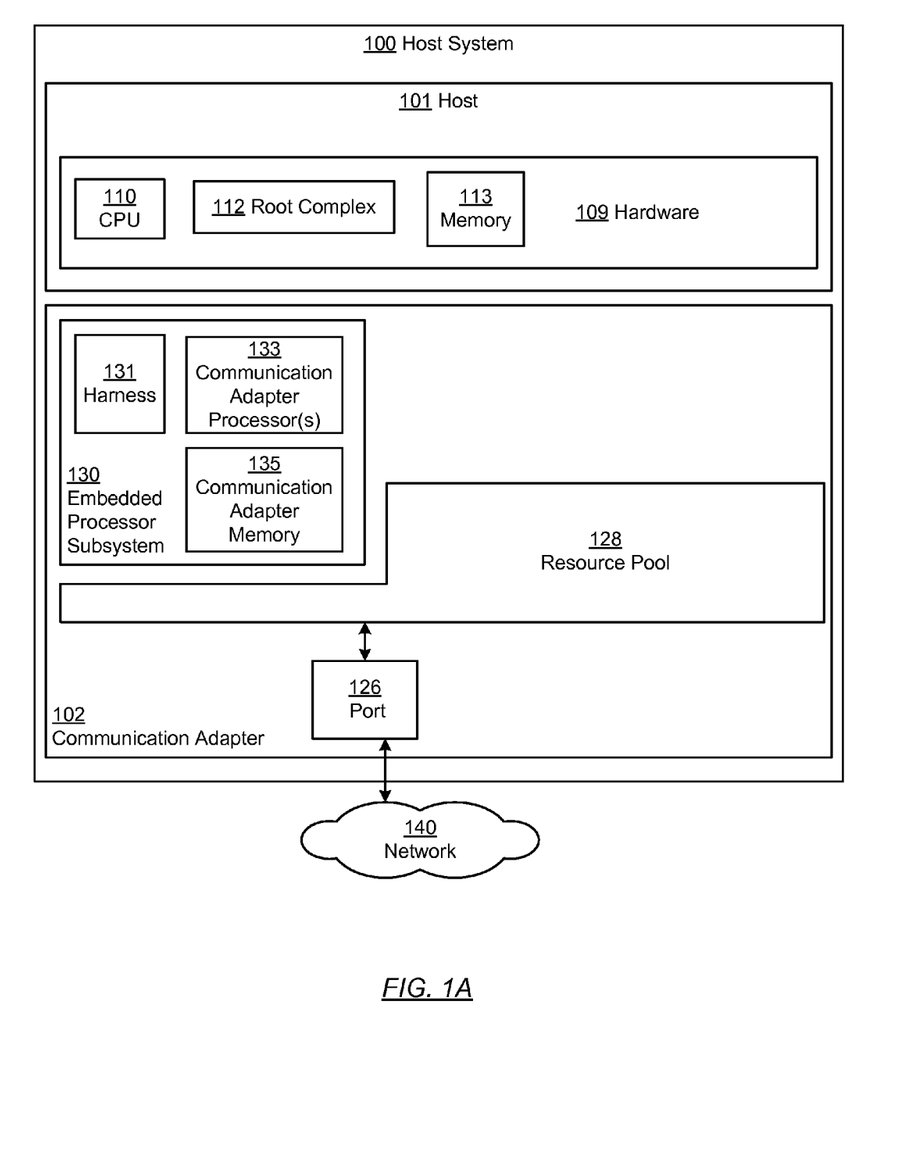
FIGS. 1A, 1B, and 2 show schematic diagrams in one or more embodiments of the invention.

FIG. 1A shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (101) and a communication adapter (102) in one or more embodiments of the invention. These components are discussed below.

In FIG. 1, the host (101) includes hardware, such as a central processing unit ("CPU") (110), memory (113), and a root complex (112). In one or more embodiments of the invention, the CPU (110) is a hardware processor component for processing instructions of the host (101). The CPU (110) may include multiple hardware processors. Alternatively or additionally, each hardware processor may include multiple processing cores in one or more embodiments of the invention. In general, the CPU (110) is any device configured to execute instructions on the host (101).

In one or more embodiments of the invention, the memory (113) is any type of hardware device for storage of data. In one or more embodiments of the invention, the memory (113) may be partitioned into separate spaces for virtual machines. In one or more embodiments, the memory (113) further includes a payload configured to be processed by the CPU (110) and the communication adapter (102).

In one or more embodiments of the invention, the CPU (110) and the memory (113) are connected, via the root complex (112) and a peripheral component interconnect (PCI) express fabric (not shown), to a communication adapter (102). Other connection mechanisms may be used without departing from the invention. In one or more embodiments of the invention, the communication adapter (102) is a hardware device configured to connect the host (101) to the network (140). Specifically, the communication adapter (102) includes functionality to receive commands from the host (101) and process the commands.

In one or more embodiments of the invention, the communications adapter is a host channel adapter ("HCA") for connecting to an Infiniband® network. For example, the host system and HCA may correspond to the host system and HCA described in U.S. patent application Ser. No. 13/149,449, entitled "Method and System for Infiniband® Host Channel Adapter Quality of Service" filed on May 31, 2011; U.S. patent application Ser. No. 13/149,436, entitled "Method and System for Processing Commands on an Infiniband® Host Channel Adapter" filed on May 31, 2011; and/or U.S. patent application Ser. No. 13/149,483, entitled "Method and System for Temporary Data Unit Storage on Communications Adapter" filed on May 31, 2011. U.S. patent application Ser. No. 13/149,449, U.S. patent application Ser. No. 13/149,436, and U.S. patent application Ser. No. 13/149,483 are all incorporated herein by reference in their entirety. Additionally or alternatively, the communication adapter may be an Ethernet card for connecting to the Internet or another communication adapter to connect to another type of network.

Commands to the communication adapter may be commands requesting the sending and/or receiving of a message from the network (140), commands for requesting that a procedure image is executed on the communication adapter, and/or commands for configuring the communication adapter. In one or more embodiments of the invention, the communication adapter is configured to process each command. Processing a command may include performing a direct memory access ("DMA") with host memory (113) to obtain and store the payload of the message and to obtain control information, performing any validation required on message, generating packets from the message, and sending and receiving packets via the network (140).

In one or more embodiments of the invention, the packet data may include a remote DMA ("RDMA") write operation and/or an atomic operation for execution at a responder node. A RDMA operation is a direct memory access of memory of a remote system that is performed independently of the host system's (100) and the remote system's operating systems. In other words, the RDMA operation is performed by the communication adapter (102) independent of the CPU (110) and a CPU of the remote system. For example, the RDMA operation may be a read operation or a write operation to read or write data from a memory of a remote system. In particular, the communication adapter (e.g., communication adapter (102), remote system communication adapter (not shown) is configured to perform the requested RDMA directly with the host memory connected to the communication adapter without requiring the CPU of the host. In this case, RDMA operations reduce the number of cycles required to be executed by the CPU (110) and the remote system CPU, thereby reducing the latency of the RDMA operations.

Returning to FIG. 1, the communication adapter (102) includes at least one port (126), a resource pool (128), and an embedded processor subsystem (130). Each of the components of the communication adapter (102) is discussed below.

In one or more embodiments of the invention, a port (126) is a physical interface connector between the communication adapter (102) and the network (140). The resource pool (128) is a collection of resources configured to send and receive packets on the network (140). Specifically, the resource pool (128) corresponds to the collection of hardware and stored data for performing the functions of the communications adapter in order to receive and send packets. The resource pool is discussed below and in FIG. 2.

The embedded processor subsystem (130) corresponds to an embedded processor and logic for managing the communication adapter (102). The embedded processor subsystem (130) includes a harness (131), communication adapter processor(s) (133), and communication adapter memory (135). The embedded processor subsystem (130) includes functionality to change the allocation of communication adapter resources, change the configuration of the communication adapter (102), and perform other management of the communication adapter (102).

More specifically, in one or more embodiments of the invention, the harness (131) is configured to manage the execution of procedure images. Specifically, the harness (131) is configured to route messages to the appropriate communication adapter processor(s) in order to initiate the execution of procedure images. In one or more embodiments of the invention, the communication adapter processor(s) (133) are hardware processors configured to execute procedure images. For example, the communication adapter processor(s) (133) may be advanced RISC machine ("ARM") processors.

In one or more embodiments of the invention, the communication adapter memory (135) is configured to store procedure images for execution by the communication adapter processor(s) (133). The communication adapter memory (135) may be partitioned into a heap/stack and a program area, where the program area is divided into program regions. In this case, each of the program regions is configured to store a procedure image for execution by a communication adapter processor (133).

In one or more embodiments of the invention, each procedure image in the communication adapter memory (135) may be associated with a procedure image identifier. Specifically, the procedure image identifier is an identifier for identifying which procedure image to use for an incoming packet. For example, the procedure image identifier may include a unique identifier of the procedure image and/or one or more communication channel identifiers. In one or more embodiments of the invention, a communication channel identifier identifies the communication channel of packets that are to be processed using the procedure image. For example, if the communication adapter is an HCA, the communication channel identifier may be a queue pair identifier for an Infiniband® send queue and/or receive queue. If the communication adapter is an Ethernet card, the communication channel identifier may correspond to a session identifier. Alternatively or additionally, the communication identifier may include or be an identifier of an application or a process requesting that the procedure image is executed on the incoming packets of the application or process.

Figure 1B:
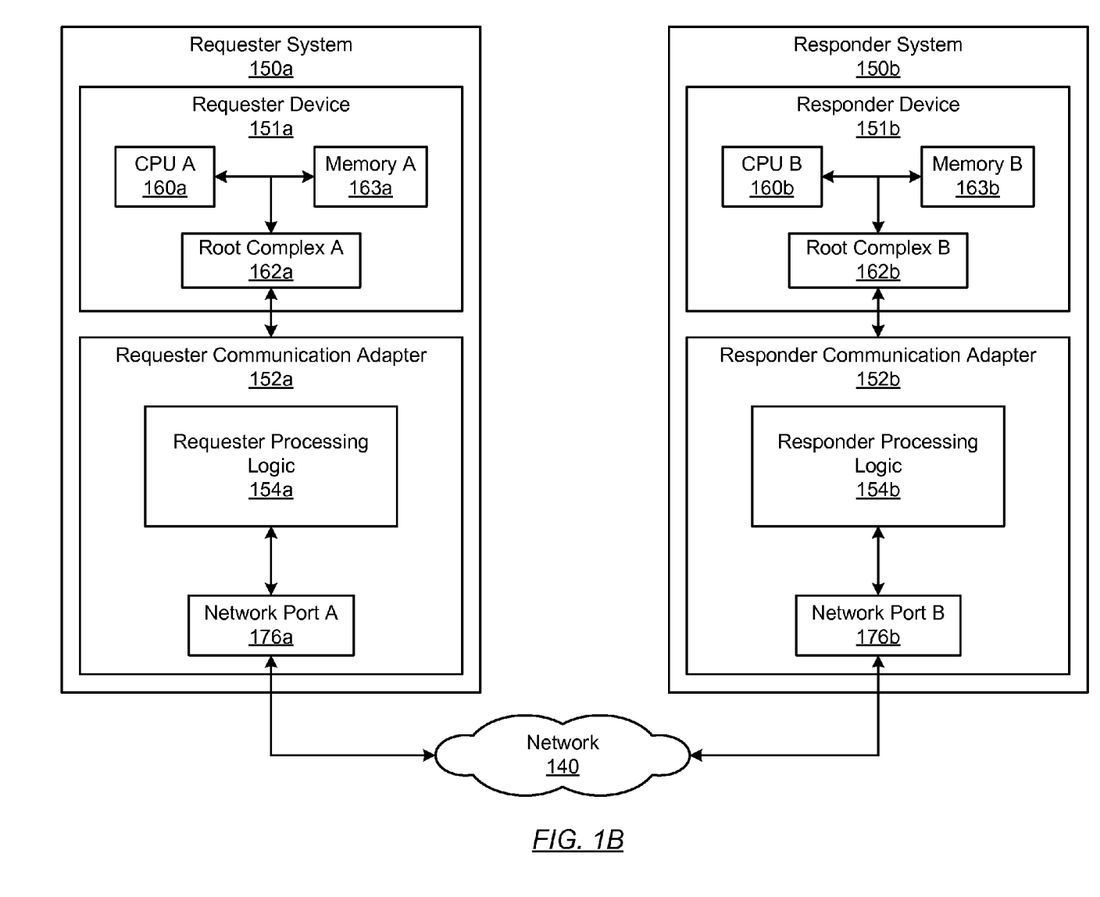

FIG. 1B shows a schematic diagram in accordance with one or more embodiments of the invention. As shown in FIG. 1B, a requester system (150a) is connected to a responder system (150b) via a network (140). The requester system (150a) includes a requester device (151a) and a requester communication adapter (152a). The requester device (151a) includes CPU A (160a), Memory A (163a), and root complex A (162a). The requester communication adapter (152a) include requester processing logic (154a) and network port a (176a). The responder system (150b) includes a responder device (151b) and a responder communication adapter (152b). The responder device (151b) includes CPU B (160b), memory B (163b), and root complex B (162b). The responder communication adapter (152b) include responder processing logic (154b) and network port b (176b).

Figure 2:
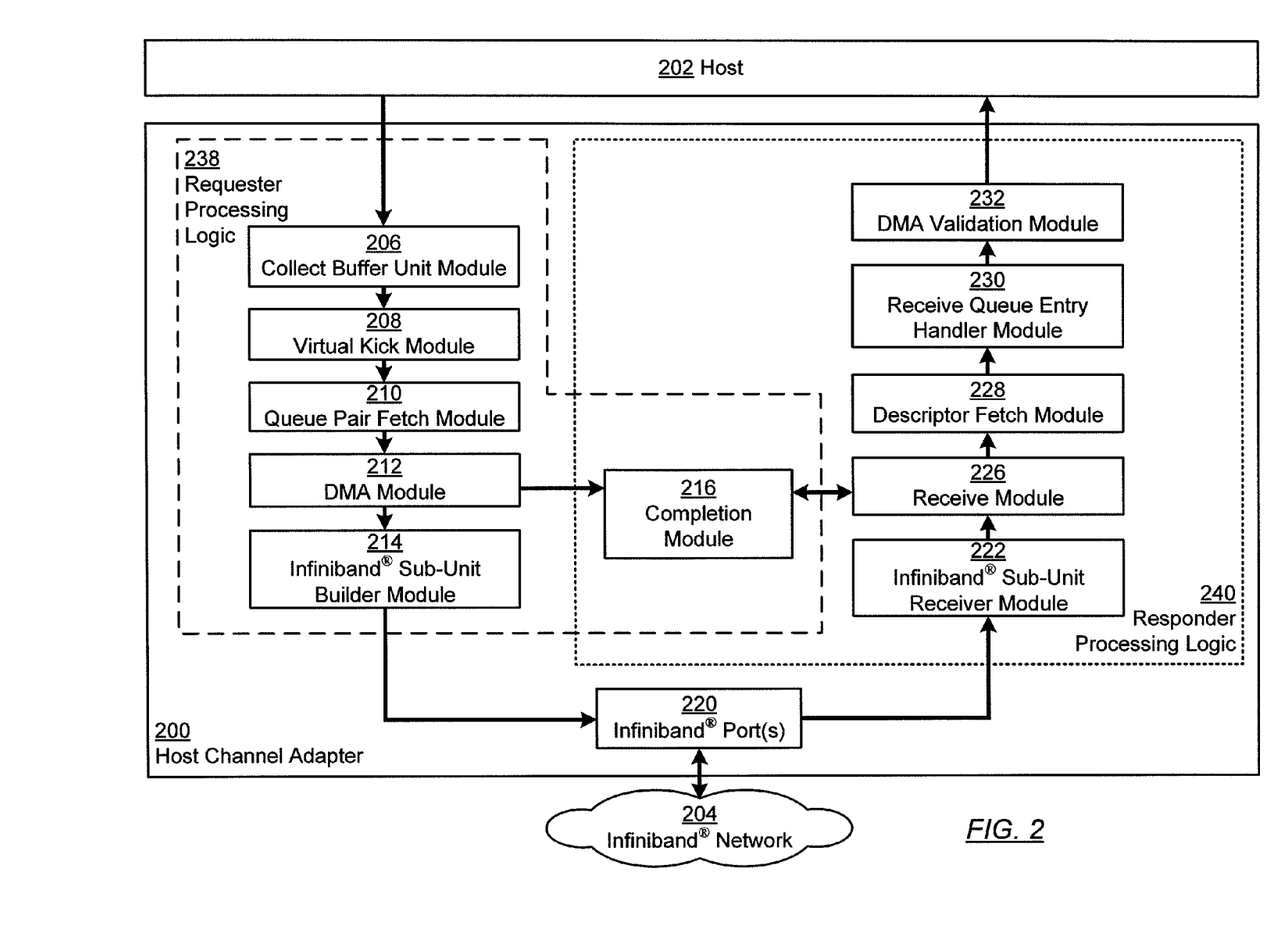

FIG. 2 shows a schematic diagram of the resource pool of the host channel adapter (200) in one or more embodiments of the invention. As shown in FIG. 2, the host channel adapter (200) may include a collect buffer unit module (206), a virtual kick module (208), a queue pair fetch module (210), a direct memory access (DMA) module (212), an Infiniband® packet builder module (214), one or more Infiniband® ports (220), a completion module (216), an Infiniband® packet receiver module (222), a receive module (226), a descriptor fetch module (228), a receive queue entry handler module (230), and a DMA validation module (232).

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message.

The dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the components of the resource pool is discussed below.

The collect buffer controller module (206) includes functionality to receive command data from the host and store the command data on the host channel adapter. Specifically, the collect buffer controller module (206) is connected to the host and configured to receive the command from the host and store the command in a buffer. When the command is received, the collect buffer controller module is configured to issue a kick that indicates that the command is received.

In one or more embodiments of the invention, the virtual kick module (208) includes functionality to load balance commands received from applications. Specifically, the virtual kick module is configured to initiate execution of commands on the non-blocking pipeline (218) in accordance with a load balancing protocol.

In one or more embodiments of the invention, the queue pair fetch module (210) includes functionality to obtain queue pair status information for the queue pair corresponding to the data unit. Specifically, per the Infiniband® protocol, the message has a corresponding send queue and a receive queue. The send queue and receive queue form a queue pair. Accordingly, the queue pair corresponding to the message is the queue pair corresponding to the data unit in one or more embodiments of the invention. The queue pair state information may include, for example, sequence number, address of remote receive queue/send queue, whether the queue pair is allowed to send or allowed to receive, and other state information. In one or more embodiments of the invention, when the queue pair status information is obtained, or as part of identifying the queue pair of the packets, the queue pair fetch module or another module of the host channel adapter may determine that the queue pair is designated as having packets that may be processed by the host channel adapter. Thus, the queue pair fetch module or another module of the host channel adapter may direct the packets of the designated queue pair to the embedded processors for processing.

In one or more embodiments of the invention, the DMA module (212) includes functionality to perform DMA with host memory. The DMA module may include functionality to determine whether a command in a data unit or referenced by a data unit identifies a location in host memory that includes packet data. The DMA module may further include functionality to validate that the process sending the command has necessary permissions to access the location, and to obtain the packet data from the host memory, and store the packet data in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (214). In one or more embodiments of the invention, the Infiniband® packet builder module includes functionality to generate one or more packets for each data unit and to initiate transmission of the one or more packets on the Infiniband® network (204) via the Infiniband® port(s) (220). In one or more embodiments of the invention, the Infiniband® packet builder module may include functionality to obtain the packet data from a buffer corresponding to the data unit, from the host memory, and from an embedded processor subsystem memory.

In one or more embodiments of the invention, the completion module (216) includes functionality to manage packets for queue pairs set in reliable transmission mode. Specifically, in one or more embodiments of the invention, when a queue pair is in a reliable transmission mode, then the receiving channel adapter of a new packet responds to the new packet with an acknowledgement message indicating that transmission completed or an error message indicating that transmission failed. The completion module (216) includes functionality to manage data units corresponding to packets until an acknowledgement is received or transmission is deemed to have failed (e.g., by a timeout).

In one or more embodiments of the invention, the Infiniband® packet receiver module (222) includes functionality to receive packets from the Infiniband® port(s) (220). In one or more embodiments of the invention, the Infiniband® packet receiver module (222) includes functionality to perform a checksum to verify that the packet is correct, parse the headers of the received packets, and place the payload of the packet in memory. In one or more embodiments of the invention, the Infiniband® packet receiver module (222) includes functionality to obtain the queue pair state for each packet from a queue pair state cache. In one or more embodiments of the invention, the Infiniband® packet receiver module includes functionality to transmit a data unit for each packet to the receive module (226) for further processing.

In one or more embodiments of the invention, the receive module (226) includes functionality to validate the queue pair state obtained for the packet. The receive module (226) includes functionality to determine whether the packet should be accepted for processing. In one or more embodiments of the invention, if the packet corresponds to an acknowledgement or an error message for a packet sent by the host channel adapter (200), the receive module includes functionality to update the completion module (216).

Additionally or alternatively, the receive module (226) includes a queue that includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a host channel adapter cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA with host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (232) includes functionality to initiate DMA with host memory when the DMA is validated.

Figure 3A:
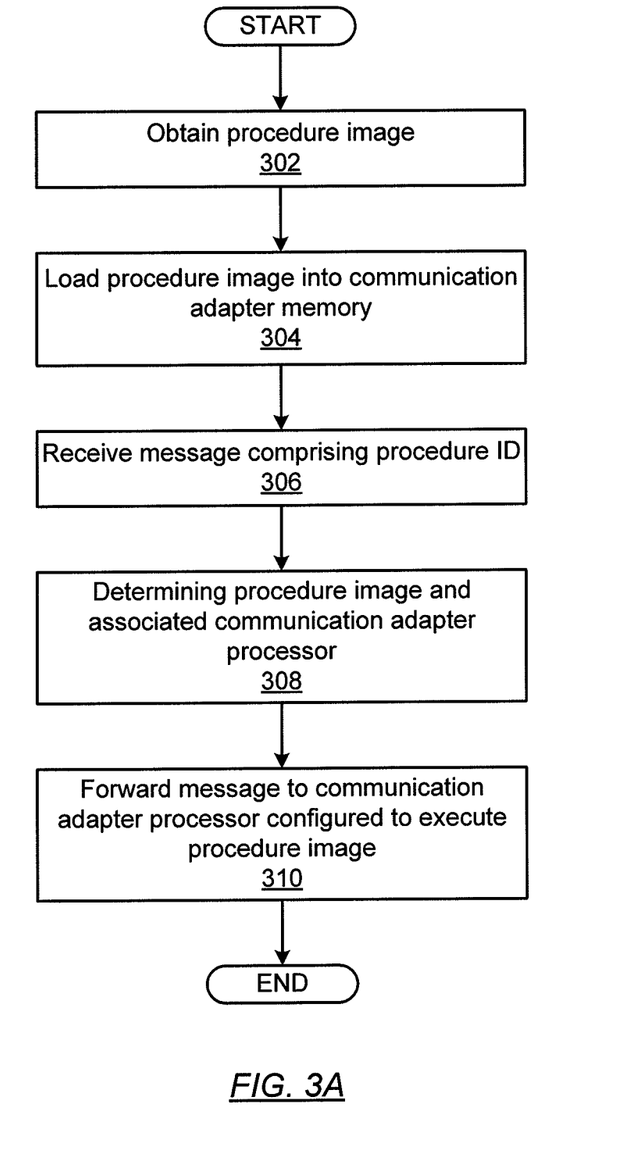
FIGS. 3A-3B show flowcharts in one or more embodiments of the invention.
Figure 3B:
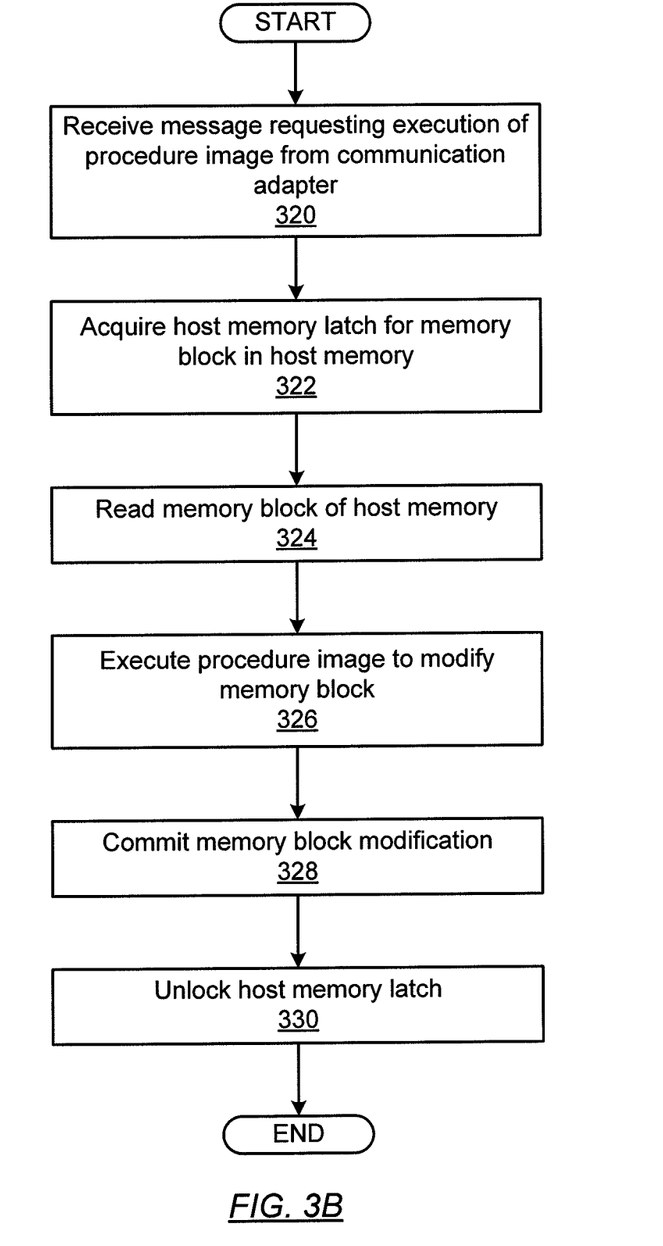

FIGS. 3A-3B show flowcharts of a method for offloading computation flexibly to a communication adapter in accordance with one or more embodiments of the invention. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIGS. 3A-3B, may be included in performing this method. Accordingly, the specific arrangement of steps shown in FIGS. 3A-3B should not be construed as limiting the scope of the invention.

FIG. 3A shows a flowchart of a method for offloading computation flexibly to a communication adapter from the perspective of a harness of a communication adapter. In Step 302, a procedure image is obtained from a host application. Specifically, the host application may send the procedure image to the communication adapter during initialization. The host application may be any application executing on the host system. In one or more embodiments of the invention, the host application is the intended receiver of a payload on the network. Sending the procedure image may include transmitting a command to the communication adapter with a location of the procedure image in host memory. In such a scenario, the communication adapter may access the host memory in order to obtain the procedure image. Further, the host application may provide the procedure image with a procedure image identifier. For example, consider the scenario in which the host application is a database service. The database service may submit a procedure image for performing database modification while the database service is initializing.

In Step 304, the procedure image is loaded into the communication adapter memory. Specifically, an embedded processor subsystem of the communication adapter may use a communication adapter driver to load the procedure image into communication adapter memory. As discussed above, the communication adapter memory may be partitioned into memory regions. At least a subset of the memory regions may be configured to store procedure images. For example, the communication adapter memory may include regions, each having storage capacity for 128 kilobytes of data. Each region may be configured to store a procedure image. The storage capacity and the procedure image may be a different size without departing from the invention. Further, in one or more embodiments of the invention, host applications may be configured with various procedure images for offloading onto the communication adapter. When loading the procedure image into the communication adapter memory, the procedure image may be associated with one or more communication adapter processors. The procedure image may be associated with a communication adapter processor using a load balancing scheme to distribute the execution of procedure images across all the communication adapter processors.

Multiple procedure images from a variety of host applications may be loaded into the communication adapter memory simultaneously. In this case, the procedure image identifier may be used to determine the appropriate memory region that is storing the requested procedure image.

In Step 306, a message is received from a requested node requesting a procedure image to be executed. For example, the message may request that a procedure image for performing a database operation (e.g., obtaining a lock on database records, obtaining database schema information, etc.) be executed. The message includes a procedure image identifier in the header of the message.

In Step 308, the procedure image and associated communication adapter processor is determined using the procedure image identifier. For example, a communication channel identifier may be obtained from the received message. The communication channel identifier from the received image may be used to identify a procedure image having the same communication channel identifier. As discussed above, the embedded processor subsystem of the communication adapter may include a number of communication adapter processors, where each communication adapter processor is configured to execute one or more procedure images.

In response to determining the associated communication adapter processor for the procedure image, the message may be forwarded to the associated communication adapter processor for processing (Step 310). For example, a harness of the communication adapter may forward the message the associated communication adapter processor and await the output of the execution of the procedure image.

FIG. 3B shows a flowchart of a method for offloading computation flexibly to a communication adapter from the perspective of a communication adapter processor. In Step 320, a message requesting execution of the procedure image is received from a harness of the communication adapter. As noted above, the message includes a procedure image identifier in the message header. The procedure image identifier may be used to determine the procedure image to be executed.

In Step 322, a host memory latch is acquired for a memory block of host memory. Specifically, a host memory latch is obtained independent of the host processor (i.e., the communication adapter processor interacts with the host memory directly), thereby offloading the execution of the procedure image to the communication adapter processor. The host memory latch grants the communication adapter processor exclusive privileges to modify the memory block. For example, a host memory latch may be obtained by performing a compare-and-swap operation of the memory block.

In Step 324, the memory block of host memory is read into communication adapter memory. For example, a buffer pointer of the communication adapter memory may be allocated and then used to read the memory block of the host memory. Once the memory block is read into communication adapter memory, the procedure image may be executed to modify the memory block (Step 326). As discussed above, the procedure image is executed by a communication adapter processor associated with the procedure image. As the procedure image is executing on the communication adapter, the instructions of the procedure image modify the memory block independent of the host processor. In other words, executing the procedure image creates a modified memory block.

Optionally, during the processing, the communication adapter processor may send requests to the host processor using a mailbox. The mailbox is a storage location that facilitates massaging between the communication adapter and the host processor. The host processor polls the mailbox to identify requests and processes the requests from the communication adapter. For example, the communication adapter processor may send via the mailbox a host instruction for the host processor to execute when the communication adapter processor is incapable of executing the host instruction. For example, the communication adapter processor may deposit a string in the mailbox to request that the host processor perform a printf (print formatted data to the standard output) of the string.

In Step 328, the modified memory block is committed to the host memory. In other words, the modifications performed in Step 326 in the communication adapter memory are committed to the host memory. After the modifications are committed, the host memory latch may be released and a result as a response packet may be returned to the harness of the communication adapter (Step 330). Upon receipt, the harness of the communication adapter may queue the response packet to be transmitted to the requester that originated the message. In the scenario in which a response packet is transmitted to a remote requester, a send queue of the queue pair associated with the message may be used to send the message to the requester. In other words, a response message is transmitted to the remote requesting node. In one or more embodiments of the invention, by the host communication adapter, processing the incoming packet from a remote node, performing the procedures with the host memory, and sending a response to the remote node without involving the host CPU, the host communication adapter allows the host CPU to remain in a sleep state or to process other tasks.

In one or more embodiments of the invention, the communication adapter processor may switch between executing threads. For example, while one thread is waiting for access from the host memory, the communication adapter processor may execute a different thread. For example, the different thread may correspond to a different procedure image in execution.

In one or more embodiments of the invention, while performing one or more of the Steps of FIG. 3B, the communication adapter may make a determination that the communication adapter should not process the message. For example, if the delay to acquire a latch on the location of the host memory is greater than a predefined threshold, such as because a host process or embedded processor has the latch, then the communication adapter may determine that the communication adapter should not process the message. By way of another example, the requirements for the communication adapter to process a particular message may be greater than a predefined threshold. In the example, in other words, processing the message may be too complex. In such an example, the tradeoff between a quick entry yet slower processor in the communication adapter may be outweighed by the longer entry times yet faster processor on the host in one or more embodiments of the invention. By way of another example, in one or more embodiments of the invention, the harness may time out the execution of the procedure image if a result is not received from the harness within a predetermined period of time. As another example, the communication adapter may not have buffer space to store an incoming packet in embedded processor subsystem of the communication adapter. When the communication adapter determines that the communication adapter should not process the packet, the packet is transmitted to the host for processing.

Figure 4:
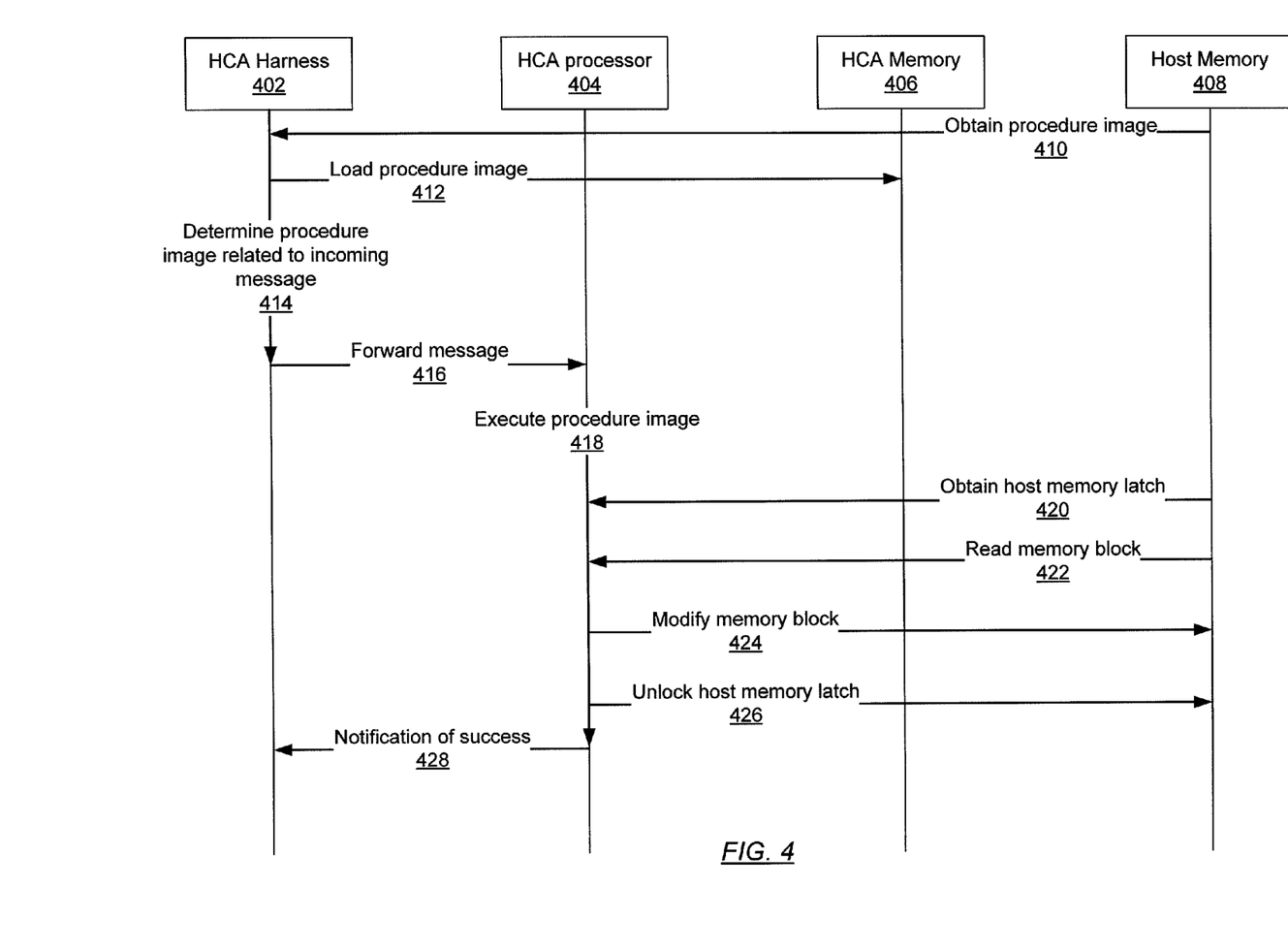
FIG. 4 shows an example in one or more embodiments of the invention.

FIG. 4 shows an example flowchart for offloading computation flexibly to a HCA. Specifically, FIG. 4 shows an example flowchart for processing a payload received from an Infiniband® network by an HCA. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention. The following example is provided for exemplary purposes only and accordingly should not be construed as limiting the invention.

In Step 410, the HCA harness (402) obtains a procedure image from the host memory (408). Specifically, a host application may send the procedure image to the HCA harness (402) during initialization of the host application. Once the procedure image is received, the procedure image may be loaded into HCA memory (406) using an HCA driver (Step 412). The procedure image is loaded into one of a number of regions in the HCA memory (406) that is configured to store procedure images. The procedure image is also associated with a procedure image identifier that may be used to identify the procedure image.

In Step 414, an incoming message is received from a requester, where the incoming message includes the procedure image identifier. The procedure image identifier is used to determine the associated procedure image and HCA processor (404). As discussed above, multiple procedure images may be simultaneously loaded into HCA memory (406) and then managed with a load balancing scheme. In this case, the HCA processor (404) may be selected because the HCA processor (404) has the lowest load of all the HCA processors.

In Step 416, the message is forwarded to the HCA processor (404) determined in Step 414. The HCA processor (404) may determine the associated procedure image using the procedure image identifier included in the message.

The HCA processor (404) executes the identified procedure image (Step 418). The procedure image is configured to perform functionality related to the host application that initially provided the procedure image. Initially, during the execution of the procedure image, the HCA processor (404) obtains a host memory latch for a memory block of the host memory (408) (Step 420). After the host memory latch is obtained, the HCA processor (404) reads the memory block into the HCA memory (406) for modification (Step 422).

In Step 424, the memory block is modified by execution of the procedure image and the modifications are committed to the host memory (408). Once the modification is committed, the execution of the procedure image may be completed by releasing the host memory latch of the memory block (Step 426).

In Step 428, a notification of success is sent to the harness (402). For example, a response packet may be provided to the harness, which may then be queued for transmission to the requested node of the message. Thus, the response packet may be transmitted to remote node transmitting the requested message. As shown by way of the example, in one or more embodiments of the invention, the communication adapter is configured to perform application layer processing of incoming messages from remote nodes and transmit a response to the remote node without interrupting the host CPU.

Embodiments of the invention may be implemented on virtually any type of computer regardless of the platform being used. For example, a computer system may include one or more processor(s) (e.g., an integrated circuit, central processing unit, or other hardware processor), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computers (not shown). The computer system may also include input means, such as a keyboard, a mouse, or a microphone (not shown). Further, the computer system may include output means, such as a monitor (e.g., a liquid crystal display (LCD), a plasma display, or cathode ray tube (CRT) monitor). The computer system may be connected to a network (e.g., a local area network (LAN), a wide area network (WAN) such as the Internet, or any other similar type of network) via a communication adapter connection (not shown). Many different types of computer systems exist, and the aforementioned input and output means may take other forms, now known or later developed. Generally speaking, the computer system includes at least the minimal processing, input, and/or output means necessary to particularly practice embodiments of the invention.

Further, one or more elements of the aforementioned computer system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for offloading computation flexibly to a communication adapter, the method comprising:
   receiving, by the communication adapter via a network from a requester system, a first message comprising a procedure image identifier associated with a procedure image of a host application, wherein the host application is located on a host connected to the communication adapter;
   determining a procedure image and a communication adapter processor using the procedure image identifier in the first message, wherein the communication adapter processor is located on the communication adapter;
   forwarding, by a harness on the communication adapter, the first message to the communication adapter processor configured to execute the procedure image; and
   executing, by the communication adapter processor, in response to the first message, and independent of a host processor located on the host, the procedure image in communication adapter memory by:

acquiring a first host memory latch for a memory block in host memory located on the host;

reading, into the communication adapter memory, the memory block in the host memory after acquiring the first host memory latch;

manipulating, by executing the procedure image, the memory block in the communication adapter memory to obtain a modified memory block;

committing the modified memory block to the host memory; and releasing the first host memory latch.

2. The method of claim 1, further comprising:

using a communication adapter driver to obtain the procedure image from a host application; and loading the procedure image into the communication adapter memory for use by the communication adapter processor.

3. The method of claim 1, wherein the communication adapter processor is one of a plurality of communication adapter processors, wherein the plurality of communication adapter processors share the communication adapter memory.

4. The method of claim 3, wherein the method further comprises:

receiving a second message comprising the procedure image identifier;

determining the procedure image and the communication adapter processor using the procedure image identifier; and forwarding the second message to the communication adapter processor configured to execute the procedure image; and making a determination, by the communication adapter processor, that the second message is to be executed by the host processor; and transmitting the second message to the host processor for processing.

5. The method of claim 4, wherein the determination is based on at least one selected from a group consisting of a delay to access a second host memory latch is greater than a first predefined threshold, the communication adapter processor has insufficient buffer space to store the second message, and execution time of the procedure image on the second message exceeds a second predefined threshold.

6. The method of claim 1, further comprising:

storing a request for a host instruction in a mailbox for the host application, wherein the host application on the host executes the host instruction in response to detecting the request in the mailbox.

7. The method of claim 1, wherein the procedure image is further executed by generating a response packet comprising a result of the procedure image, and wherein the method further comprises:

sending the response packet to the requester system.

8. The method of claim 1, wherein the communication adapter is a host channel adapter.

9. A communication adapter comprising:

communication adapter memory configured to store a procedure image of a host application, wherein the host application is located on a host connected to the communication adapter;

a harness configured to:

receive, a network from a requester system, a message comprising a procedure image identifier associated with a procedure image of the host application;

determine the procedure image and a communication adapter processor using the procedure image identifier in the message, wherein the communication adapter processor is located on the communication adapter; and forward the message to the communication adapter processor configured to execute the procedure image; and a plurality of communication adapter processors comprising the communication adapter processor, the communication adapter processor configured to execute, in response to the message and independent of a host processor located on the host, the procedure image by:

acquiring a host memory latch for a memory block in host memory located on the host;

reading, into the communication adapter memory, the memory block in the host memory;

manipulating, by executing the procedure image, the memory block in the communication adapter memory to obtain a modified memory block;

committing the modified memory block to the host memory; and unlocking the host memory latch.

10. The communication adapter of claim 9, wherein the host memory comprises a heap and a program area, wherein the program area comprises a plurality of regions each configured to store the procedure image.

11. The communication adapter of claim 9, wherein the harness is further configured to:

use a communication adapter driver to obtain the procedure image from a host application; and load the procedure image into the communication adapter memory for use by the communication adapter processor.

12. The communication adapter of claim 9, wherein the plurality of communication adapter processors share the communication adapter memory.

13. The communication adapter of claim 9, wherein the communication adapter is a host channel adapter.

14. The communication adapter of claim 9, wherein the host memory comprises:

a mailbox, and wherein the communication adapter processor is further configured to:

store a request for a host instruction in the mailbox for the host application, wherein the host application on the host executes the host instruction in response to detecting the request in the mailbox.

15. A non-transitory computer readable medium storing instructions for offloading computation flexibly to a communication adapter, the instructions comprising functionality to:

receive, by the communication adapter via a network from a requester system, a first message comprising a procedure image identifier associated with a procedure image of a host application, wherein the host application is located on a host connected to the communication adapter;

determine a procedure image and a communication adapter processor using the procedure image identifier in the first message, wherein the communication adapter processor is located on the communication adapter; and forward, by a harness on the communication adapter, the first message to the communication adapter processor configured to execute the procedure image; and execute, by the communication adapter processor, in response to the first message, and independent of a host processor located on the host, the procedure image in communication adapter memory by:

acquiring a first host memory latch for a memory block in host memory located on the host;

reading, into the communication adapter memory, the memory block in the host memory after acquiring the first host memory latch;

manipulating, by executing the procedure image, the memory block in the communication adapter memory to obtain a modified memory block;

committing the modified memory block to the host memory; and unlocking the first host memory latch.

16. The non-transitory computer readable medium of claim 15, wherein the communication adapter is a host channel adapter.

17. The non-transitory computer readable medium of claim 15, wherein the instructions further comprise functionality to:

receive a second message comprising the procedure image identifier;

determine the procedure image and the communication adapter processor using the procedure image identifier; and forward the second message to the communication adapter processor configured to execute the procedure image; and make a determination, by the communication adapter processor, that the second message is to be executed by the host processor; and transmit the second message to the host processor for processing.

18. The non-transitory computer readable medium of claim 17, wherein the determination is based on at least one selected from a group consisting of a delay to access a second host memory latch is greater than a first predefined threshold, the communication adapter processor has insufficient buffer space to store the second message, and execution time of the procedure image on the second message exceeds a second predefined threshold.

19. The non-transitory computer readable medium of claim 15, the instructions further comprising functionality to:

store a request for a host instruction in a mailbox for the host application, wherein the host application on the host executes the host instruction in response to detecting the request in the mailbox.

20. The non-transitory computer readable medium of claim 15, wherein the procedure image is further executed by generating a response packet comprising a result of the procedure image, and wherein the instructions further comprise functionality to:

send the response packet to the requester system.

* * * * *